United States Patent
Zaiser et al.

[11] Patent Number: 6,053,056
[45] Date of Patent: Apr. 25, 2000

[54] ORIFICE PLATE FOR METERING THE FLOW OF A MEDIUM

[75] Inventors: LeNoir E. Zaiser; Kevin Confoy, both of Naples, Fla.

[73] Assignee: Inovo, Inc., Naples, Fla.

[21] Appl. No.: 08/941,356

[22] Filed: Sep. 30, 1997

Related U.S. Application Data

[60] Provisional application No. 60/029,624, Oct. 25, 1996.

[51] Int. Cl.[7] .............................. G01F 1/42; F16K 25/00
[52] U.S. Cl. ........................................ 73/861.61; 251/205
[58] Field of Search ........................... 73/861.61, 861.62; 251/205, 206, 210, 207

[56] References Cited

U.S. PATENT DOCUMENTS

| | | | |
|---|---|---|---|
| 4,445,808 | 5/1984 | Arya | 405/259 |
| 4,572,477 | 2/1986 | Phlipot et al. | 251/285 |
| 4,909,476 | 3/1990 | Messick | 251/206 |
| 5,036,879 | 8/1991 | Ponci | 137/496 |
| 5,593,136 | 1/1997 | Reed et al. | 251/366 |
| 5,614,679 | 3/1997 | Johnson | 73/756 |
| 5,640,997 | 6/1997 | Reed et al. | 137/881 |

OTHER PUBLICATIONS

Transcript of Preliminary Injunction Hearing, Cause No. IP97–1367–C H/G (S.D. Ind. Mar. 18, 1998), pps. 1–4, 41–48, 133–136 (esp. pps. 134, 1. 23–135, 1. 11: Testimony of Gilbert Davidson, Chairman of Flotec, Inc.).

*Primary Examiner*—Harshad Patel
*Attorney, Agent, or Firm*—Hamilton, Brook, Smith & Reynolds, P.C.

[57] ABSTRACT

Semi-spherical supports are used in the piercing of small, consistently sized holes in a soft metal. In particular, an orifice plate can be fabricated with small, consistently sized flow apertures to regulate flow in a gas flow regulating device. By using semi-spherical supports, the need for hand-punching and real-time flow calibration can be avoided and automated machinery with a tapered piercing tool can be used to fabricate orifice plates.

44 Claims, 4 Drawing Sheets

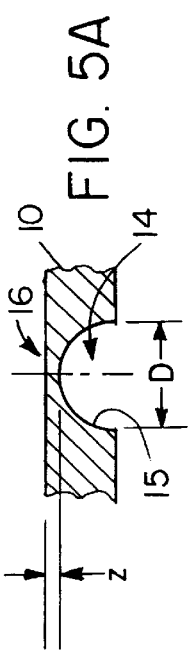
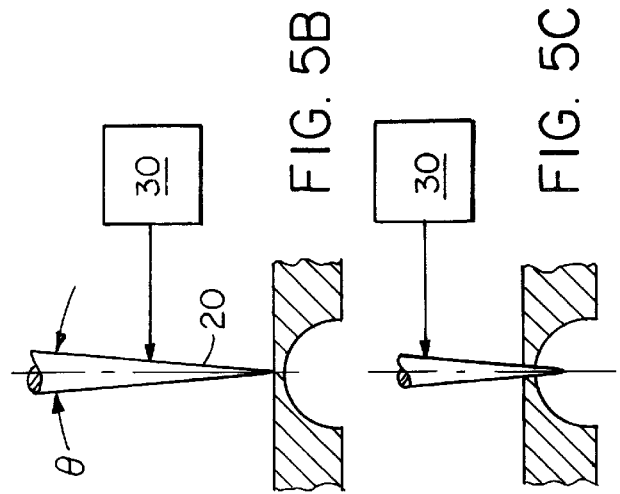
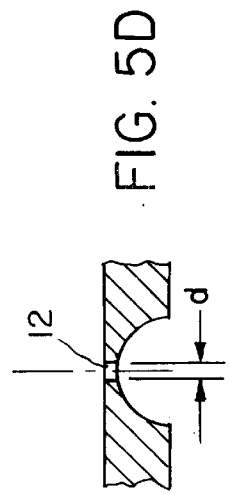
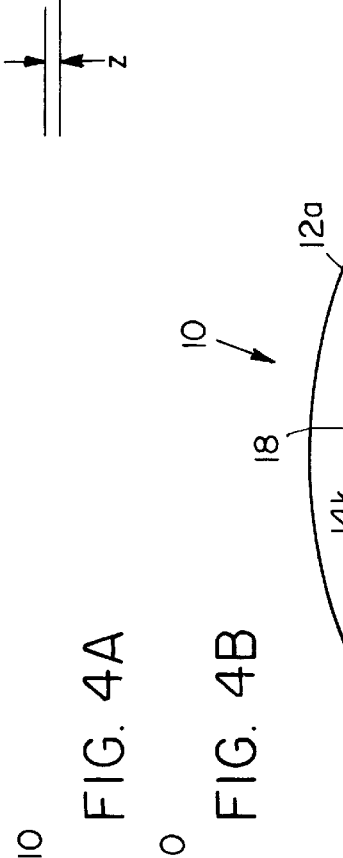
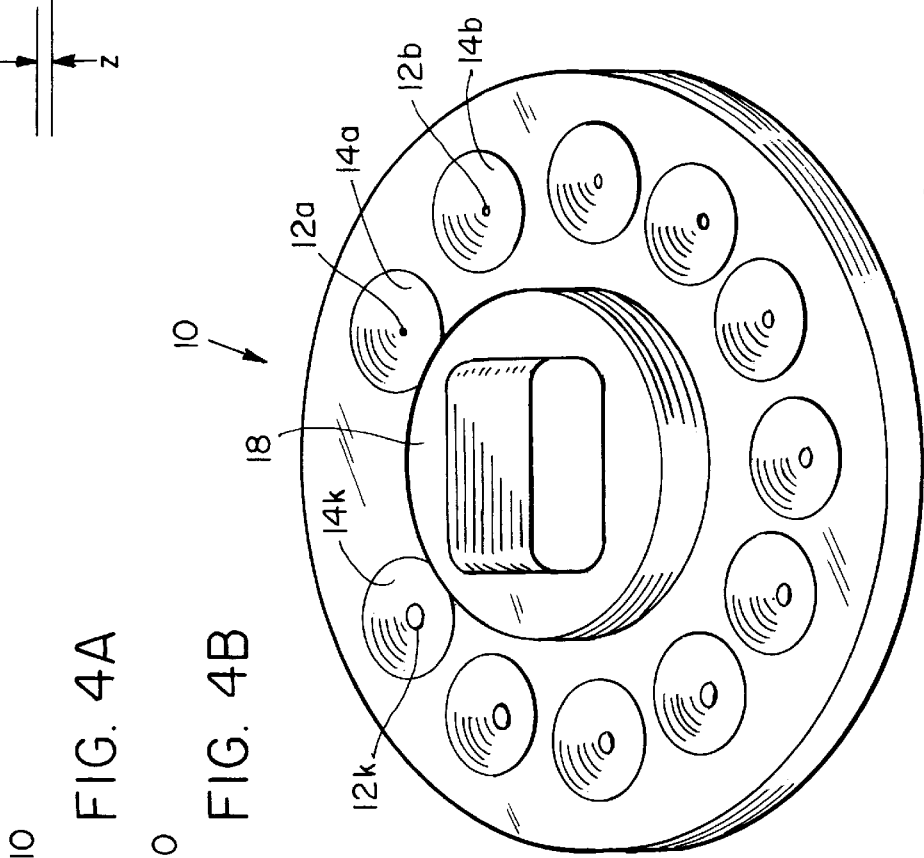
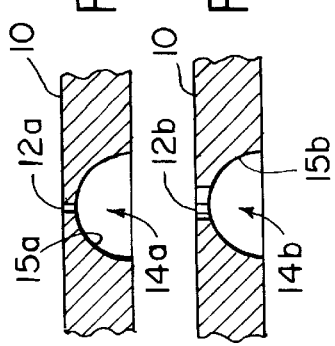

ORIFICE PLATE FOR METERING THE FLOW OF A MEDIUM

RELATED APPLICATIONS

This application claims priority to U.S. Provisional Application No. 60/029,624 filed on Oct. 25, 1996, the teachings of which are incorporated herein by reference in their entirety.

BACKGROUND OF THE INVENTION

In a medical setting, oxygen can be delivered to a patient from a cryogenic vessel, high pressure gas storage vessel or other controlled pressure delivery sources, such as a hospital delivery system. Such an oxygen delivery system includes an adjustable flow regulator to select a flow rate of oxygen to the patient. Adjustable flow regulators typically include a circular orifice plate having a plurality of apertures of varying sizes through which the oxygen can flow.

In order to create an aperture that allows a certain flow rate, users of prior art techniques typically create an undersized aperture using a hand tool, measure the flow rate, and subsequently increase the aperture size and measure the flow rate until gas flows at the desired rate. Other prior art methods utilize needle valves, stamping or compression of a large aperture, fabrication and assembly of discrete components, blockage of a flow conduit by a ball or tapered pin, photoetching of a thin metal disk which is subsequently attached to a thicker plate, or other largely manual methods.

To obtain an accurate flow rate, a real-time flow measurement is therefore made of each aperture during fabrication. Because this is largely a manual process, accurate registration is difficult to achieve, sometimes yielding a secondary aperture proximate to the main aperture to produce the proper flow rate. If the flow rate of a particular aperture is greater than a desired flow rate, then the entire part is rejected.

SUMMARY OF THE INVENTION

Prior art techniques suffer from at least two disadvantages. First, they are time-consuming and labor intensive processes. Second, they do not take full advantage of the fact that flow rates are proportionally related to hole sizes.

In accordance with preferred embodiments of the invention, orifice plates are manufactured having flow apertures which are fabricated to have accurate dimensions. As such, real-time measurement and repair is unnecessary. Consequently, every orifice plate can be identically fabricated, within allowed tolerances, using automated machinery.

An orifice plate in accordance with the invention includes a rigid circular plate of material, such as brass or other soft metal, having a first surface and a second surface. A counterbore forms a domed support structure in the material at each flow aperture location. Specifically, the domed support structure has a partial ellipsoidal, or conical shape. In accordance with one aspect of the invention, the domed support structure has a semi-spherical shape. The counterbore thus defines a support structure having an open base at the first surface and an apex proximate to the second surface. Prior art attempts at piercing thin-walled orifice plates have failed due to the lack of such a support.

A flow aperture is formed through the material from the second surface and is registered to the apex of the support structure. In particular, there are a plurality of apertures, each aperture having a respective size and registered to an apex of a respective support structure.

The support structures and the apertures are preferably formed by a computer controlled machine. In particular, the computer controls a piercing tool which is automatically registered to the apex of the support structure and inserted through the thinned material. By using a computer-controlled process, orifice plates can be repeatedly reproduced to be substantially identical, within permitted tolerance.

In accordance with a preferred embodiment of the invention, the orifice plate is used in a flow regulator. In a preferred flow regulator, an inflow conduit provides oxygen or another gas at a substantially constant pressure and an outflow conduit provides the gas at a specific flow rate. The orifice plate is coupled between the inflow conduit and the outflow. In particular, the flow regulator adjustably controls the flow of medical oxygen from a supply vessel to a patient. In such an application, the flow apertures vary in size from about 0.0007 square millimeters to about 0.8 square millimeters and the thickness of plate material at the apex of the dome structure is about 0.1 millimeter.

BRIEF DESCRIPTION OF THE DRAWINGS

The above and other features of the invention, including various novel details of construction and combination of parts, will now be more particularly described with reference to the accompanying drawings and pointed out in the claims. It will be understood that the particular orifice plates embodying the invention are shown by illustration only and not as a limitation of the invention. The principles and features of the invention may be embodied in varied and numerous embodiments without departing from the scope of the invention.

FIG. 2 is a back-side perspective view of a preferred orifice plate in accordance with the invention.

FIGS. 4A–4B are cross-sectional diagrams of a support structure having a first and second flow aperture of FIG. 2, respectively.

FIGS. 5A–5D are process flow diagrams of a preferred method of forming the flow apertures of FIG. 2.

DETAILED DESCRIPTION OF PREFERRED EMBODIMENTS OF THE INVENTION

Figure 1A:
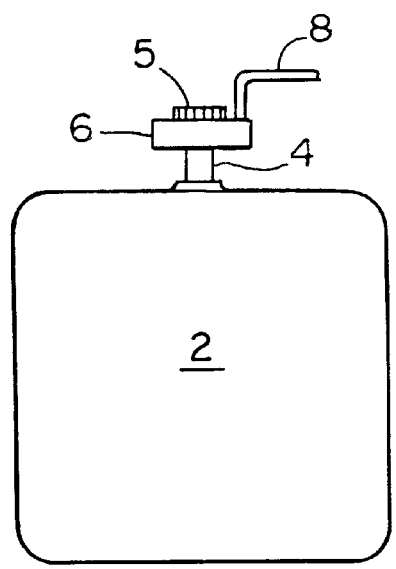
FIGS. 1A–1B are a simplified perspective view of a typical cryogenic and high pressure supply vessel, respectively.
Figure 1B:
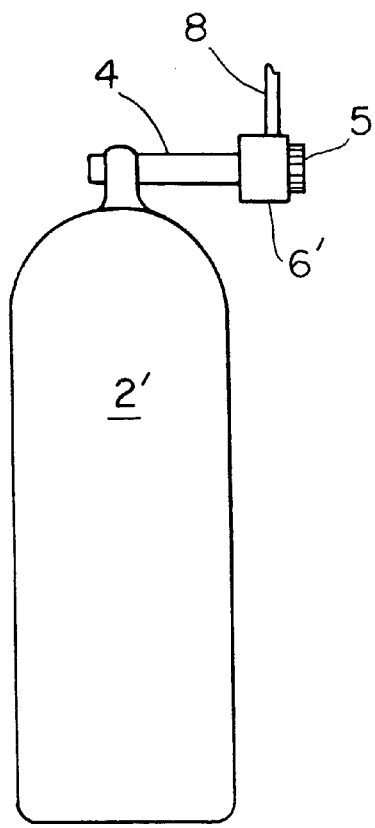

FIGS. 1A–1B are a perspective view of a typical cryogenic and high pressure supply vessel, respectively. The vessel 2, 2' is preferably an oxygen supply vessel. An adjustable flow regulator 6, 6' is coupled to a supply conduit 4 from the vessel 2, 2'. Within the flow regulator 6, 6' is a circular orifice plate (described below), which has a plurality of discrete flow settings. Each flow setting is registered to a respective flow aperture. Each aperture supports a specific flow rate through an outflow conduit 8, 8', as indicated by the setting of an adjusting dial 5.

FIG. 2 is a back-side perspective view of a preferred orifice plate 10. As illustrated, the orifice plate includes eleven flow apertures 12a–12k corresponding to eleven discrete flow settings. Each flow aperture 12a–12k has a respective flow area corresponding to a preselected flow rate. An optional mounting hub 18 can be utilized to register the orifice plate 10 to the adjusting dial 5 (FIG. 1). Although eleven flow apertures are illustrated, corresponding to eleven selectable flow rates, a greater number or a smaller number of flow apertures 12 can be provided, depending on the intended application.

Figure 3:
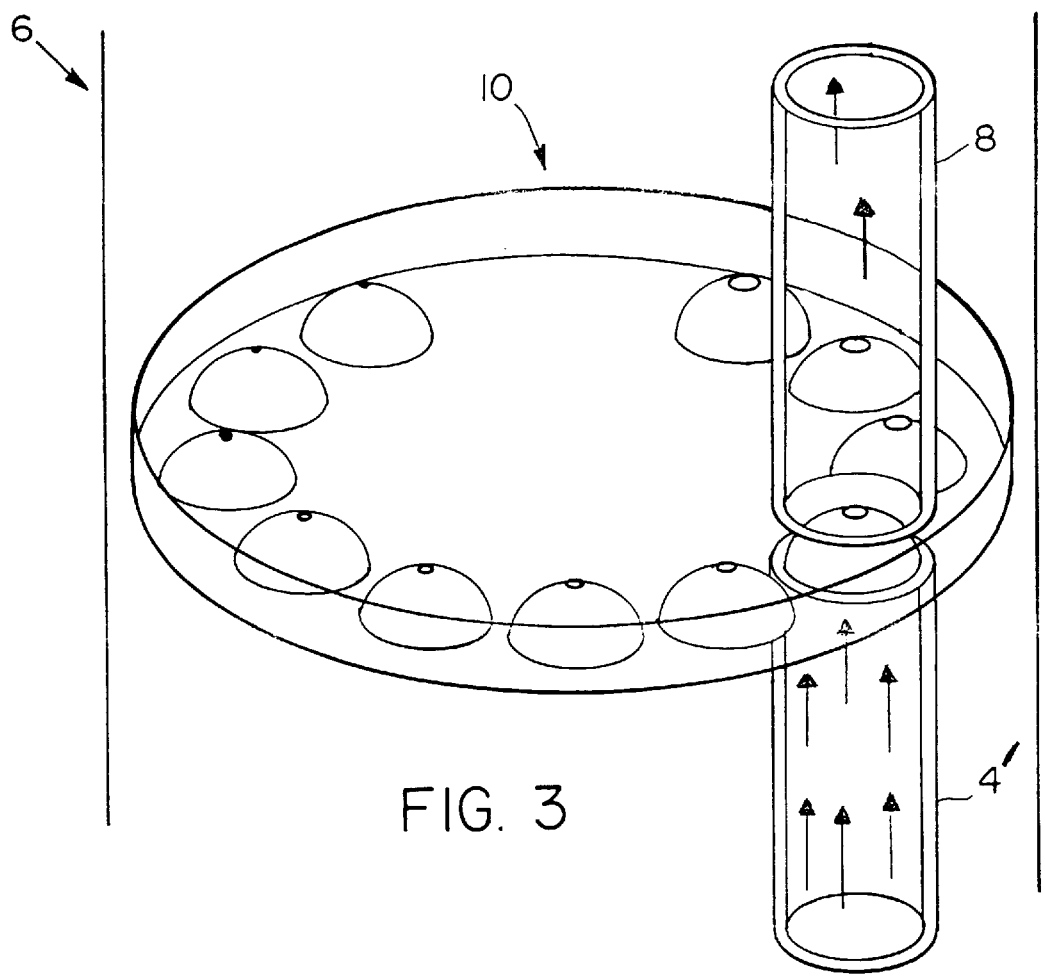
FIG. 3 is a schematic diagram of a preferred orifice plate embodied in an illustrative flow regulator.

FIG. 3 is a schematic diagram of a preferred orifice plate 10 embodied in an illustrative flow regulator 6. The orifice plate 10 separates a inflow conduit 4' from an outflow conduit 8. It will be understood that the orientation of the orifice plate can be reversed from that shown. It will also be understood that the orifice plate 10 can be adapted for use in any flow regulator which uses a prior art orifice plate. A particular embodiment of a flow regulator having an orifice plate as described herein is commercially available from Inovo, Inc. of Naples, Fla.

Returning to FIG. 2, each flow apertures 12a–12k is preferably centered relative to a respective counter-bore 14a–14k. As viewed from the back side, the counter-bores 14a–14k create a domed support structure from the plate material. As the term is used herein, a domed structure is a three-dimensional structure having an open base and a wall having an apex. Examples of dome wall shapes include partial ellipsoidal shapes, such as semi-spheres and elliptic paraboloids, and conical shapes. In all cases, a cross-section taken through the apex reveals an arched-shape support wall, which can include semicircular, semi-oval, or triangular shapes.

FIGS. 4A–4B are cross-sectional diagrams of a first and a second flow aperture 12a, 12b of FIG. 2, respectively. As illustrated, both flow apertures 12a, 12b have a circular flow area and the first flow aperture 12a has a smaller diameter than the second flow aperture 12b. As illustrated, the principle axis of each flow apertures 12a, 12b is registered to a respective apex of a domed structure 14a, 14b having a semi-spherical wall 15a, 15b. Precise registration between the flow apertures 12a, 12b and the apex of the domed structures 14a, 14b, however, is not critical.

A primary purpose of the domed support is to allow rapid, automatic piercing of apertures between 0.03 millimeter (0.001 inch) and 1 millimeter (0.039 inch) in diameter. When a tapered tool is employed, the computer controls the size of the aperture by controlling the depth of the pierce. This eliminates the need for hand-piercing and real-time flow calibration, which are necessary without the use of domed supports. Instead, the flow apertures 12 can be fabricated using automated piercing machinery.

Although prior art techniques have included counter-bores, they used cylindrical-shaped counter bores. Those counter-bores were used to thin a region of the plate material and a flow aperture was then formed through this thinned material. Because of the relatively large target area of the thinned material (i.e., an area of a substantially constant thickness), precise alignment between a piercing tool and the bore was not required. Due to flex and rebound of the relatively thin material being pierced, however, the size of each aperture, and therefore its flow rate, could not be accurately achieved.

FIGS. 5A–5D are process flow diagrams for creating a preferred flow aperture in accordance with the invention. The area of material 16 being pierced should be sufficiently thin to allow a tool to make a hole without breaking the material or a piercing tool 20. In accordance with a preferred embodiment of the invention, the orifice plate is made of brass or another soft metal. The thinned material is preferably less than about 0.3 millimeter (0.01 inch) thick. To achieve this thickness, as illustrated in FIG. 5A, a counter bore 14 having a diameter D of about 3.2 millimeters (0.125 inch) is applied to the orifice plate 10 of greater thickness. The distance z between the apex of the wall 15 and the opposite surface 16 of the orifice plate 10 is preferably thinned to about 0.1 millimeter (e.g., 0.0035 inch). It will be understood that the exact dimensions are a design choice of the user and can depend on the materials used for the orifice plate 10 and the piercing tool 20.

Referring to FIG. 5B, the piercing tool 20 is placed in position under the control of an automated machine 30. Specifically, the central axis of the piercing tool 20 is registered with the apex of the semi-spherical void 14. The piercing tool 20 can have a conical, pyramidal or other shape suitable for piercing the orifice plate 10. As illustrated, the piercing tool 20 is tapered at an angle θ, which can be chosen by the user. For example, the angle θ can be suitably chosen to be about 7–10°.

Referring to FIG. 5C, the piercing tool 20 is forced into the orifice plate 10. As the piercing tool 20 goes deeper, a larger hole is created. By using a semi-spherical support, there is little or no flex or resulting rebound from applying the piercing tool 20 to the structure. Downward forces are dispersed down the wall into progressively thicker material.

Referring to FIG. 5D, a circular flow aperture 12 having a diameter d has been created using a conical piercing tool 20. For example, the flow aperture 12 can have a diameter d of 1 millimeter±0.006 millimeter (e.g., 0.003 inch±0.0002 inch). By using a semi-spherical support, the required tool depth to achieve a given aperture diameter is predictable, which permits the automated fabrication of flow apertures. Although the aperture 12 is illustrated as having a circular flow area, the actual shape of the aperture 12 depends on the shape of the piercing tool 20. Accordingly, the flow aperture 12 can have a circular, oval, polygonal or any other suitable shape.

In accordance with a preferred embodiment of the invention, both the counter-bores 14 and the flow apertures 12 are formed using a single Computer Numerical Control (CNC) machine. Sample orifice plates are selected for quality control inspection, which includes off-line flow rate measurements.

Figure 6:
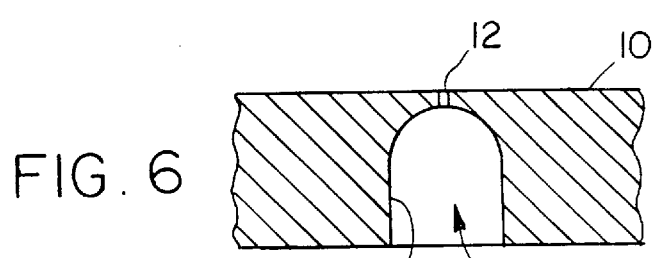
FIG. 6 is a cross-sectional diagram of another embodiment of a support structure.

FIG. 6 is a cross-sectional diagram of another embodiment of a support structure. As illustrated, a counter-bore 14' yields an ellipsoidal-walled support structure 15' in the plate material 10.

Figure 7:
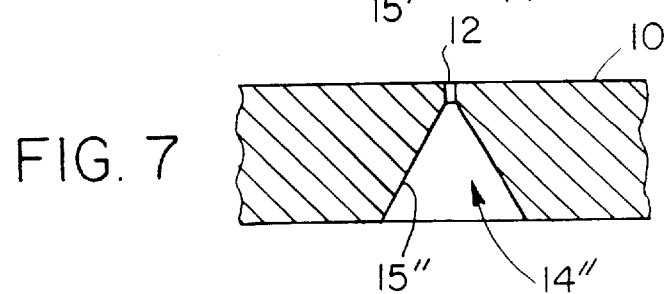
FIG. 7 is a cross-sectional diagram of yet another embodiment of a support structure.

FIG. 7 is a cross-sectional diagram of yet another embodiment of a support structure. As illustrated, a counter-bore 14" yields a conical-walled support structure 15" in the plate material 10. Such an embodiment may be particularly useful for supporting extremely small flow apertures.

Figure 8:
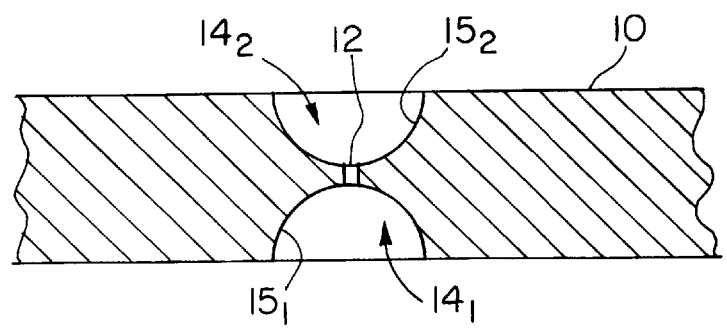
FIG. 8 is a cross-sectional diagram of still another embodiment of a support structure.

FIG. 8 is a cross-sectional diagram of yet another embodiment of a support structure. As illustrated, two opposing counter-bores $14_1$, $14_2$ are formed in the plate material 10. The flow aperture 12 is formed by piercing the thinned plate material between the apexes of the counter-bores $14_1$, $14_2$. Although the counter-bores $14_1$, $14_2$ are illustrated as having semi-circular walls $15_1$, $15_2$, any of the aforementioned shapes or combinations can be substituted.

Figure 9:
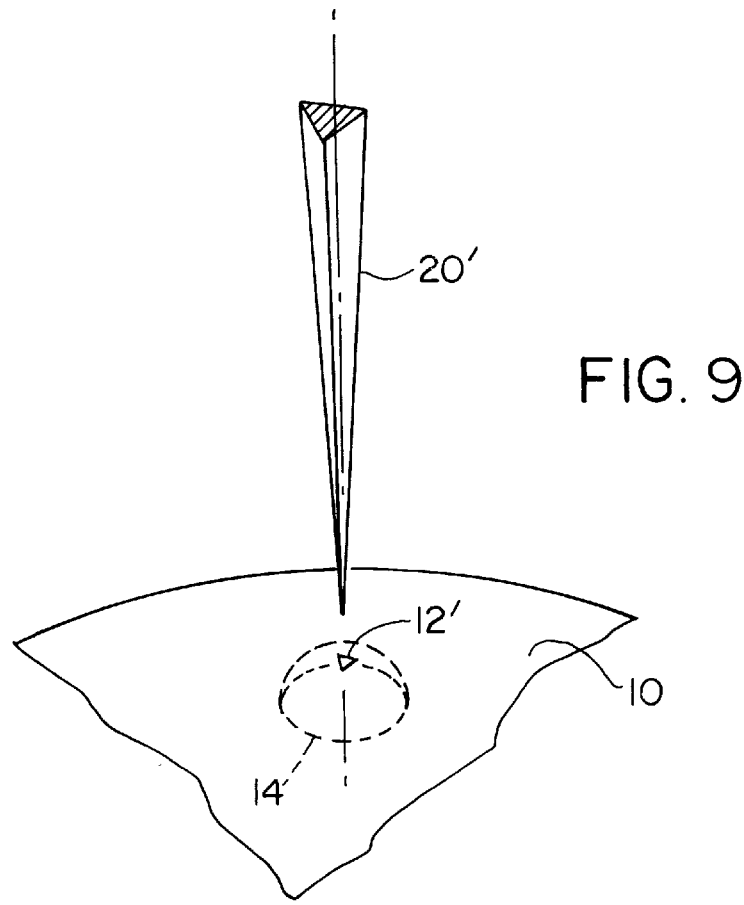
FIG. 9 is a perspective view of a preferred embodiment of the invention employing a pyramidal piercing tool.

FIG. 9 is a perspective view of a preferred embodiment of the invention employing a pyramidal piercing tool 20'. As illustrated, the piercing tool 20' yields a triangular aperture 12' in the plate material 10. The aperture 12' is centered on the apex of a respective counter bore 14 (shown in phantom). Although the pyramidal piercing tool 20' is shown as having three sides, it will be understood that the piercing tool 20' can have a greater number of sides.

EQUIVALENTS

While the invention has been particularly shown and described with reference to preferred embodiments thereof, it will be understood that those skilled in the art that various changes in form and detail can be made without departing from the spirit and scope of the invention as defined by the appended claims. For example, an orifice plate made in accordance with the invention can be used in other gas or liquid flow devices.

These and all other equivalents are intended to be encompassed by the following claims.

The invention claimed is:

1. An orifice plate for metering the flow of a medium comprising:
    a rigid plate of material having a front surface and a back surface;
    a plurality of domed-shaped counter bores formed in the front surface of the plate, each counter bore yielding a progressively thinned region of material from the front surface to an apex of the counter bore; and
    a plurality of apertures through the rigid plate, each aperture coaxially registered to a respective counter bore, each aperture formed to yield a selected flow of a medium introduced at a substantially constant input pressure.

2. The orifice plate of claim 1 wherein the surfaces of the rigid plate are circular and the counter bores are annularly spaced around the plate.

3. The orifice plate of claim 1 wherein the counter bores are substantially identical.

4. The orifice plate of claim 1 wherein each aperture is formed to have a respective flow area.

5. The orifice plate of claim 1 wherein at least one aperture has a polygonal shaped cross section.

6. The orifice plate of claim 1 wherein the counter bores have a partial ellipsoidal shape.

7. The orifice plate of claim 1 wherein the material is a soft metal.

8. The orifice plate of claim 1 wherein the aperture is a formed feature.

9. The orifice plate of claim 1 wherein at least one aperture has a circular shaped cross section.

10. The orifice plate of claim 1 wherein the rigid plate includes opposing counter bores and each aperture extends through the thinned plate material between the apexes of the respective opposing counter bores.

11. The orifice plate of claim 1 wherein the thinned plate material measures about 0.3 millimeter.

12. The orifice plate of claim 1 wherein the thinned plate material measures between about 0.1 and 0.3 millimeter.

13. An apparatus for metering the flow of a gas, comprising:
    an inflow conduit for providing a gas at a substantially constant input pressure;
    an outflow conduit for providing the gas at an output flow rate; and
    an orifice plate coupled between the inflow conduit and the outflow conduit, the orifice plate comprising:
        a rigid plate of material having a front surface and a back surface;
        a plurality of domed-shaped counter bores formed in the front surface of the plate, each counter bore yielding a progressively thinned region of material from the front surface to an apex of the counter bore; and
        a plurality of apertures through the rigid plate, each aperture coaxially registered to a respective counter bore, each aperture formed to yield a flow of the gas at the output flow rate from the input pressure of the gas.

14. The apparatus of claim 13 wherein the gas is oxygen.

15. The apparatus of claim 13 wherein the counter bores have a partial ellipsoidal shape.

16. The apparatus of claim 15 wherein the shape includes semi-spherical.

17. The apparatus of claim 13 wherein the counter bores have a conical shape.

18. The apparatus of claim 13 wherein each aperture has a respective dimension.

19. The apparatus of claim 13 wherein at least one aperture has a polygonal shape.

20. The apparatus of claim 13 wherein each aperture of the orifice plate is formed to have a flow area computed based on a desired output flow rate through the aperture.

21. The apparatus of claim 20 wherein at least one aperture has a flow area of less than about 0.8 mm$^2$.

22. The apparatus of claim 20 wherein at least one aperture has a flow area of less than about 0.008 mm$^2$.

23. The apparatus of claim 13 wherein at least one aperture has a circular shaped cross section.

24. The apparatus of claim 13 wherein rigid plate includes opposing counter bores and each aperture extends through the thinned plate material between the apexes of the respective opposing counter bores.

25. The apparatus of claim 13 wherein the thinned plate material measures about 0.3 millimeter.

26. The apparatus of claim 13 the thinned plate material measures between about 0.1 and 0.3 millimeter.

27. The apparatus of claim 13 wherein the orifice plate is moveable to position a selected aperture in communication with the inflow conduit and the outflow conduit.

28. The apparatus of claim 13 wherein the front surface of the rigid plate faces the inflow conduit.

29. A method for metering the flow of a gas, comprising the steps of:
    providing a gas at a substantially constant input pressure through an inflow conduit;
    providing the gas at an output flow rate through an outflow conduit; and
    coupling an orifice plate between the inflow conduit and the outflow conduit, the orifice plate comprising:
        a rigid plate of material having a front surface and a back surface;
        a plurality of domed-shaped counter bores formed in the front surface of the plate, each counter bore yielding a progressively thinned region of material from the front surface to an apex of the counter bore; and
        a plurality of apertures through the rigid plate, each aperture coaxially registered to a respective counter bore, each aperture formed to yield a flow of the gas at the output flow rate from the input pressure of the gas.

30. The method of claim 29 wherein the gas is oxygen.

31. The method of claim 29 wherein the counter bores have a partial ellipsoidal shape.

32. The method of claim 31 wherein the shape includes semi-spherical.

33. The method of claim 29 wherein the counter bores have a conical shape.

34. The method of claim 29 wherein each aperture has a respective dimension.

35. The method of claim 29 wherein at least one aperture has a polygonal shaped cross section.

36. The method of claim 29 wherein each aperture is formed to have a flow area computed based on a desired output flow rate through the aperture.

37. The method of claim 36 wherein the aperture has a flow area of less than about 0.8 mm$^2$.

38. The method of claim 36 wherein the aperture has a flow area of less than about 0.008 mm$^2$.

39. The method of claim 29 wherein at least one aperture has a circular shaped cross section.

40. The method of claim 29 wherein the rigid plate includes opposing counter bores, each aperture extending through the thinned plate material between the apexes of the respective opposing counter bores.

41. The method of claim 29 wherein the thinned plate material measures about 0.3 millimeter.

42. The method of claim 29 wherein the thinned plate material measures between about 0.1 and 0.3 millimeter.

43. The method of claim 29 wherein the orifice plate is moveably coupled so that the orifice plate is movable to position a selected aperture in communication with the inflow conduit and the outflow conduit.

44. The method of claim 29 wherein the orifice plate is coupled so that the front surface of the rigid plate faces the inflow conduit.

* * * * *